United States Patent
Khan et al.

(10) Patent No.: US 8,478,981 B2
(45) Date of Patent: Jul. 2, 2013

(54) METHOD OF ADDING A POSTSCRIPT MESSAGE TO AN EMAIL

(75) Inventors: Zafar Khan, Redondo Beach, CA (US); Terrance Tomkow, Los Angeles, CA (US)

(73) Assignee: Rpost International Limited, Pembroke, Hamilton (BM)

( * ) Notice: Subject to any disclaimer, the term of this patent is extended or adjusted under 35 U.S.C. 154(b) by 871 days.

(21) Appl. No.: 12/395,333

(22) Filed: Feb. 27, 2009

(65) Prior Publication Data

US 2009/0217028 A1 Aug. 27, 2009

Related U.S. Application Data

(60) Provisional application No. 61/032,057, filed on Feb. 27, 2008.

(51) Int. Cl.
*H04L 29/06* (2006.01)

(52) U.S. Cl.
USPC ........... 713/150; 380/225; 380/226; 380/227; 380/228; 380/229; 713/151; 713/152; 713/153; 713/154; 713/155

(58) Field of Classification Search
USPC .................. 713/150, 151–155; 380/225–229
See application file for complete search history.

(56) References Cited

U.S. PATENT DOCUMENTS

| | | | |
|---|---|---|---|
| 4,713,780 A | 12/1987 | Schultz et al. | |
| 5,177,680 A | 1/1993 | Tsukino et al. | |
| 5,557,320 A * | 9/1996 | Krebs | 725/114 |
| 5,781,901 A * | 7/1998 | Kuzma | 1/1 |
| 6,014,689 A * | 1/2000 | Budge et al. | 709/206 |
| 6,598,076 B1 | 7/2003 | Chang et al. | |
| 6,836,792 B1 * | 12/2004 | Chen | 709/220 |
| 7,783,708 B2 * | 8/2010 | Zaner-Godsey et al. | 709/206 |
| 2001/0034769 A1 * | 10/2001 | Rast | 709/206 |
| 2001/0042043 A1 * | 11/2001 | Shear et al. | 705/51 |
| 2003/0204567 A1 * | 10/2003 | Martino et al. | 709/206 |
| 2005/0108344 A1 * | 5/2005 | Tafoya et al. | 709/206 |
| 2006/0041625 A1 * | 2/2006 | Chen et al. | 709/206 |
| 2006/0236249 A1 * | 10/2006 | Weissman | 715/752 |
| 2007/0005702 A1 * | 1/2007 | Tokuda et al. | 709/206 |
| 2007/0233788 A1 * | 10/2007 | Bender | 709/206 |

OTHER PUBLICATIONS

Espacenet search, Espacenet Result list, Oct. 2011.*
PCT Report, IPRP report, Feb. 2009.*
International Search Report issued Apr. 9, 2009, pp. 1-2.

* cited by examiner

*Primary Examiner* — Andy Rao
*Assistant Examiner* — Shan Elahi
(74) *Attorney, Agent, or Firm* — John K. Fitzgerald; Fulwider Patton LLP

(57) ABSTRACT

A system and method providing for appending of a note or instruction to the contents of an email such that the note or instructions is only appended to emails of selected recipients of a group of recipients, with only the email going to the other recipients of the group of recipients is provided.

13 Claims, 12 Drawing Sheets

METHOD OF ADDING A POSTSCRIPT MESSAGE TO AN EMAIL

CROSS-REFERENCES TO RELATED APPLICATIONS

This application claims priority from U.S. Application No. 61/032,057, filed Feb. 27, 2008, which is hereby incorporated by reference in its entirety.

FIELD OF THE INVENTION

This invention relates to electronic mail transfer. More specifically, the invention relates to a system and method providing for the attachment of an additional note to an email such that the note is sent only to selected addressees of the email, and which is presented to a recipient in a manner clearly separating it from the text of the original email, but still visible when the original email is viewed.

BACKGROUND

Correspondence between people by written documents carried by an intermediary from one person or place to another can be dated back nearly to the invention of writing. The first documented use of an organized courier service for the diffusion of written documents is in Egypt, where Pharaohs used couriers for the diffusion of their decrees in the territory of the State (2400 BC). The first credible claim for the development of a real postal system comes from Persia (present day Iran).

Mail assumed electronic format in 1965. E-mail started as a way for multiple users of a time-sharing mainframe computer to communicate with each other. E-mail was quickly extended to become 'network e-mail', allowing users to pass messages between different computers by at least 1966.

In recent years e-mail has become an indispensable business tool. E-mail has replaced "snail mail" for many business practices because it is faster, cheaper, and generally more reliable. In hard copy mail, people often record notes on pieces of paper for filing or for providing to others. These 'others' may receive carbon copies of the mail message along with these notes. The next evolution was the creation of the yellow "Post-It" sticky notes that are used on letters and other documents to transmit notes to the recipients of the letters or documents.

In present day e-mail compilation programs, the user is provided with options such as TO, CC, and BCC which prompts the user to enter the recipients' email address.

The abbreviation 'CC' refers to the practice of sending a message as a "carbon copy." Typically this is for notification purposes. Typically, supervisory personnel are notified with 'CC'. When a supervisor is 'CC' ed, it may also imply approval with thoughts expressed in the email. For example, a secretary may send an email about an upcoming meeting. The secretary's name appears in the 'from' line and the supervisor is 'CC' ed. Instructions, in addition to the main mail, if any, will have to be added in to the main mail itself mentioning special attention to the concerned persons.

The 'CC' recipients are revealed to all recipients. As this may not be desirable, depending on the situation, an alternative field, BCC (Blind Carbon Copy) is available for hidden notification. In common usage, 'To' field recipients are the primary audience of the message, 'CC' field recipients are others whom the author wishes to publicly inform of the message, and 'BCC' field recipients are those surreptitiously being informed of the communication. The sender may also want to add personal comments or instructions to the group of 'BCC' ed recipients. Doing this in the main mail defeats the purpose of the 'BCC' field.

In multi-level organizations, emails are sent out in bulk; that is, multiple recipients receive an email sent from a single source. Typically, all the fields (TO, CC, BCC) are populated with addresses depending on the priority of the content, the addressee of the content, and/or the task of the content. If a need arises to send out instructions to a certain group, typically highlighted by the group of recipients as listed under the 'CC' field or by the group of recipients as listed under the 'BCC' field, the sender has to send additional emails apart from a copy of the main message or include the instructions in the main mail. However, incorporating the latter technique poses a threat with respect to privacy and security, and also may portray lack of etiquette.

Various techniques have been proposed in the prior art for appending notations or instructions to an email and then delivering the email to a recipient. For example, U.S. Pat. Nos. 4,713,780, 5,177,680 and 6,598,076 and U.S. Patent Publication Nos. 2006/0041625 and 2007/0233788 disclose systems for the delivery of email and/or attachments to selected recipients. However, none of these references solve the problem of providing for the appending of a note or instruction to an email that will be sent to or displayed by only a select portion of a group of recipients of the email.

What has been needed, and heretofore unavailable, is a system and method wherein notes or instructions may appended to an email and then sent to addressees of the email in a manner where the appended notes or instructions are sent only to selected addressees, and the email without the appended notes or instructions are sent to the rest of an addressee list. Moreover, such a system will also provide for optimizing the task of sending out emails by selectively using the TO, CC, and BCC functionalities in conjunction with each other. The invention satisfies these and other needs.

SUMMARY OF THE INVENTION

In its broadest aspect, the invention provides for appending a note or instruction to an email in a manner that allows the email including the appended note or instruction to be sent only select addressees, while allowing the email without the appended note or instruction to be sent to other addressees of the email. In another aspect, the note or instructions may be presented to a recipient of the email such that the note or instruction may be viewed simultaneously with the original content of the email. In yet another aspect, the content of the appended note or instruction may be encrypted and decrypted so as to provide an indication of whether the note or instruction were modified after the email including the note or instruction was sent to an addressee.

In yet another aspect, the invention provides an emailing system for compiling and sending at least one email message and at least one distinct added message via a network from a sender to a plurality of recipients' email addresses, said emailing system comprising: a means for compiling said email message; a means for compiling said distinct added message; a first inputting means for creating a request for inputting at least one recipient's address for receiving said email message; a second inputting means for creating a request for inputting at least one recipient's address for receiving said email message along with said distinct added message; an appending means to append said distinct added message to said email message; a first routing means to route said email selectively to requested addresses of said recipients; and a second routing means to route said email with said decrypted and appended distinct added message selectively to requested addresses of said recipients.

In still another aspect, the invention includes partitioning means to partition email recipients into specific groups and means to request and append at least one said appended distinct added message to one or more recipients in a group.

In yet another aspect, the invention includes a system that includes a server, particularly a standalone server on which the routing means are located. In yet another aspect, the system may also include an authenticating means for authenticating identity of said sender. In an alternative aspect, the authentication means may be resident on the server.

In a further aspect, an encryption means and a decryption means are included to encrypt and decrypt the distinct added message.

In a still further aspect, the system includes authenticating means for authenticating identity of said sender, said authenticating means being partly resident at sender end and partly resident on said server.

In yet another aspect, the distinct added message may consist of text, picture, video, audio, and a combination of these.

In an alternative aspect having a standalone server, a dedicated routing means may be provided for routing said distinct added message from said standalone server to said addresses of requested recipients and may include pointer means adapted to point location of said distinct added message along with said email message for said addresses of requested recipient.

In still another aspect of the invention, a timed display control means for displaying said distinct added message to said address of requested recipient for a pre-determined time may be included.

In yet another aspect of the invention, there is provided a method for compiling and sending at least one email message and at least one distinct added message via a network from a sender to a plurality of recipients' addresses, said method comprising: prompting a user to compile an email message; requesting said user to add an address of a first recipient for receiving said email message; requesting said user to add an address of at least one second recipient for receiving said email and said distinct added message; prompting said user to compile said distinct added message; appending said distinct added message to said email deliverable to said second recipient; routing said email to the address of said first recipient; and routing said email and appended distinct added message to address of said second recipient.

In an alternative aspect, the method may include partitioning email recipients into specific groups and requesting and appending at least one said added message to address of said one or more recipients in a group and a step for authenticating the identity of said sender. In another alternative aspect, the method may further include encrypting said distinct added message and decrypting said distinct added message before routing said email and appended distinct added message to address of said second recipient.

In an additional aspect, the method may include routing of message via said standalone server and include a step for routing said distinct added message and tagging a time-dependent eraser for erasing said distinct added message from recipient's display after a pre-determined lapse of time. Alternatively, authenticating the identity of said sender may be included.

DETAILED DESCRIPTION OF THE PREFERRED EMBODIMENTS

The system in accordance with various embodiments of the invention is adapted to send mail via the internet, that is, to send email from a sender to a plurality of recipients, the email including a main mail and an added message. The main mail is typically sent to each of the recipients. The added message is selectively appended with the main mail by the system and selectively routed to the intended recipient(s).

Figure 1:
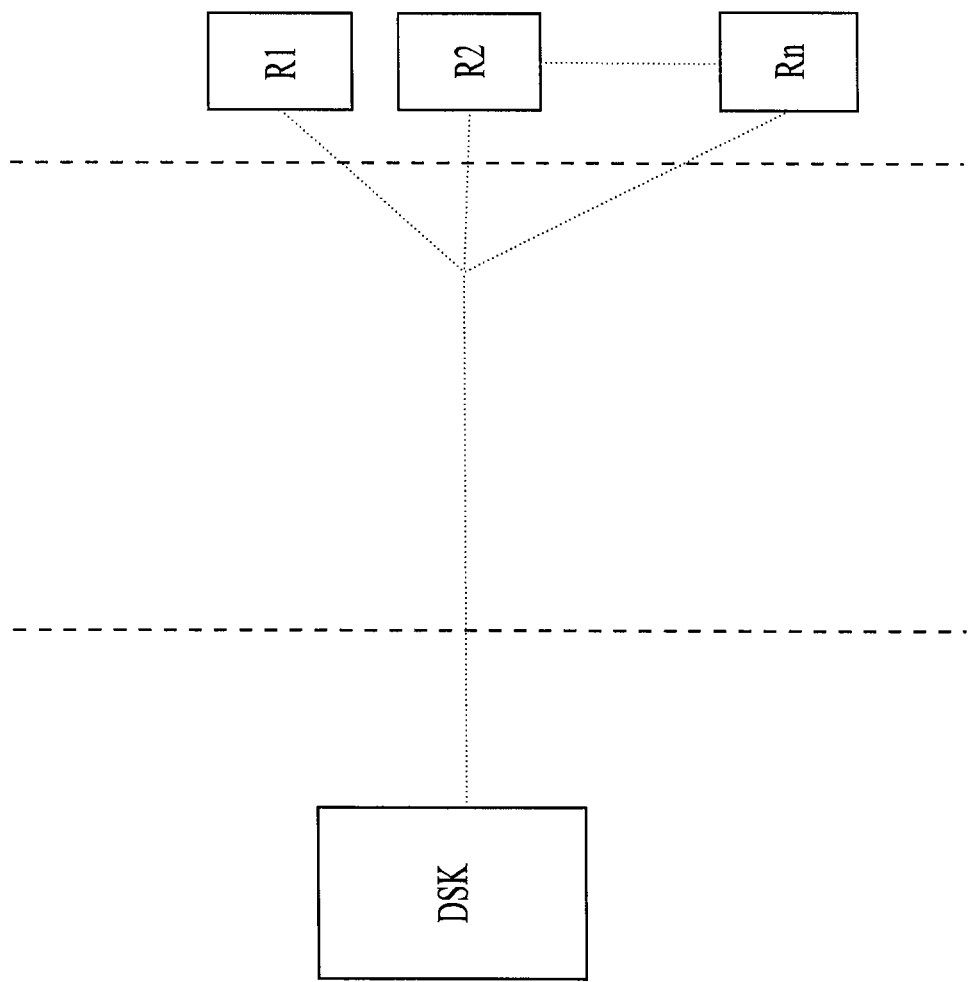
FIG. 1 illustrates one embodiment of the system.

FIG. 1 illustrates one embodiment of the system in accordance with this invention, and is explained herein. A sender accesses a user-system (DSK) adapted to send email. The user-system (DSK) prompts the user to compile an email. Further, the user-system (DSK) includes partitioning means to partition email recipients into specific groups, typically the main recipient (R1) and the secondary recipients (R2, . . . , Rn). The system then prompts the user to populate the recipients' addresses; main recipient (R1) and secondary recipients (R2, . . . , Rn). The user-system in accordance with this invention now prompts the user to select whether it wants to add an added message to the existing main message. The added message is typically for the secondary recipients (R2, . . . , Rn). Upon populating the text field of the main mail and the recipient's address (R1, R2, . . . , Rn), the user-system (DSK) prompts the user to populate the text field of the added message. This may be in the form of text, audio, video, picture file or a combination of these. The user-system (DSK) is adapted to append the added message to the main mail. The system may also include authentication means for authenticating identity of said sender. The system may include encryption means to encrypt the added message before transmitting. The system may then include decryption means to decrypt the added message before being received by the sender. The user-system (DSK) is further adapted to route the email to the intended main recipient (R1) and the email along with appended message to the intended secondary recipients (R2, . . . , Rn).

Figure 2:
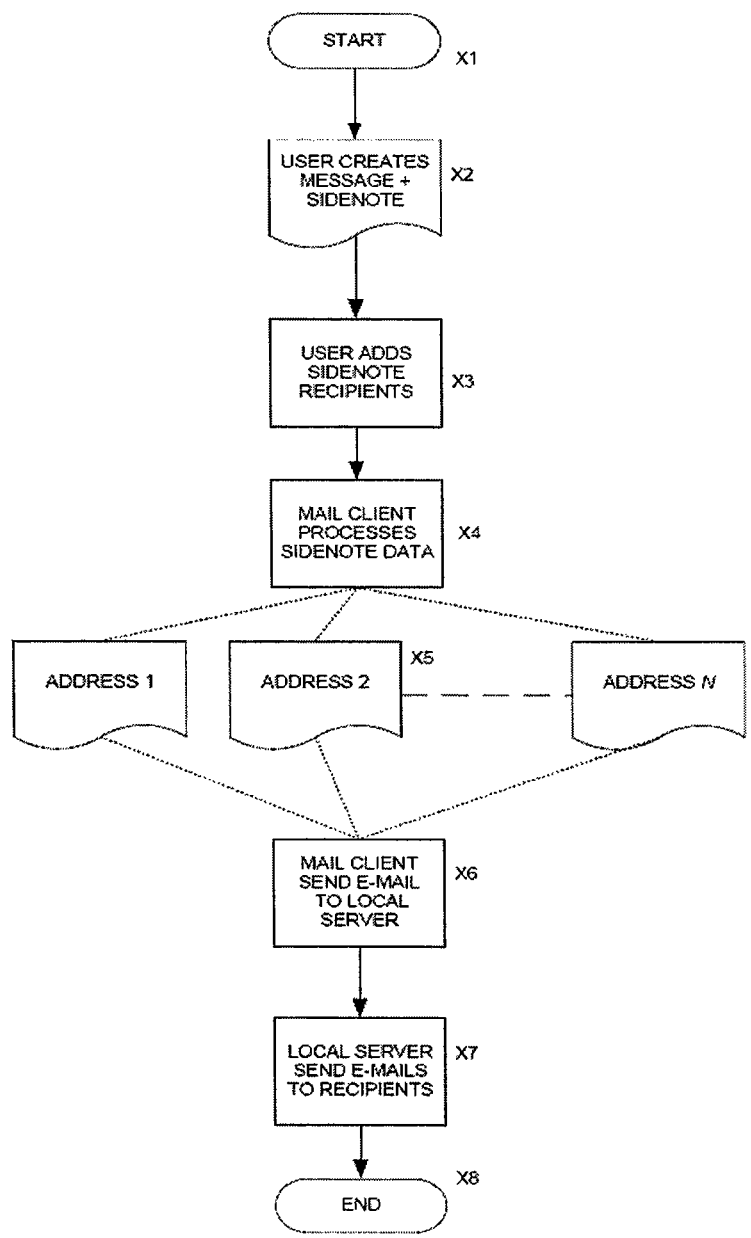
FIG. 2 illustrates a more detailed process of the embodiment of FIG. 1.

FIG. 2 illustrates the embodiment of the system shown in FIG. 1 with additional details describing the implementation of the system. A sender composes a new message in an e-mail program (X1) by creating a new message (as normally done). The email program (X1) further prompts the sender to add a distinct message in addition to the whole message (X2). The sender then indicates which recipients should receive the whole message and also which recipients should receive the whole message along with the appended distinct added message (X3). The sender sends the email and the mail client data processor processes the distinct added message (X4). The processor processes the distinct added message which includes separating the recipients and associating the appropriate distinct added message data for each recipient as the sender had indicated (X5). The mail client sends each recipient email to the local mail server (X6) where it is transmitted from the local server to each recipient (X7).

Figure 3:
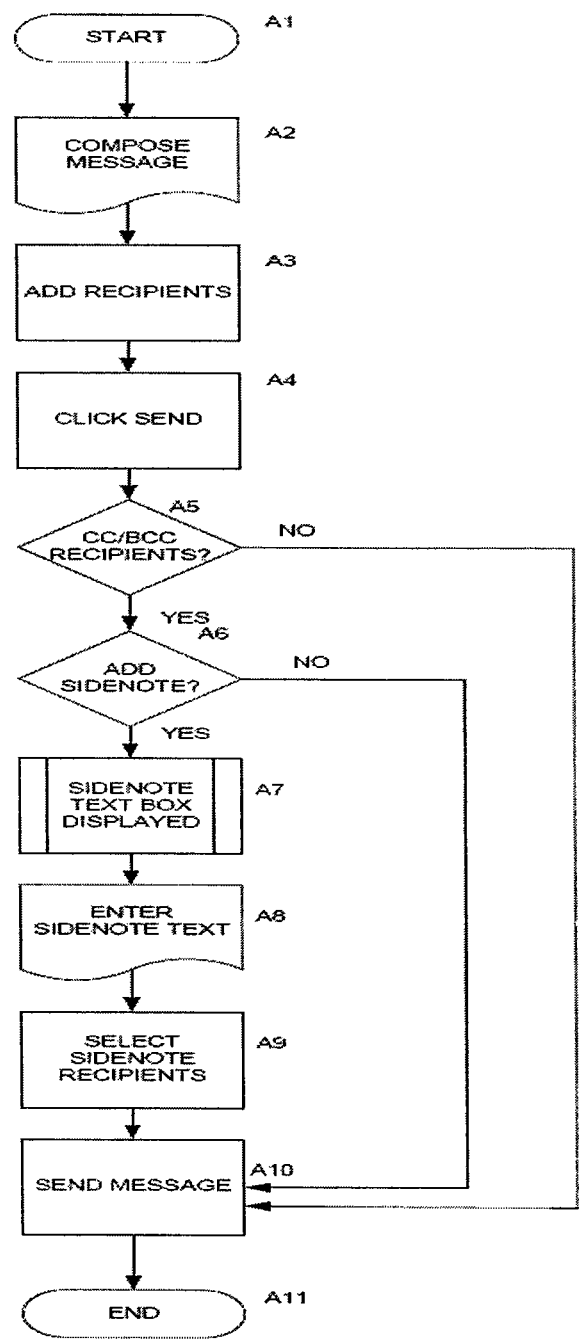
FIG. 3 illustrates a diagram of the sending process.
Figure 4:
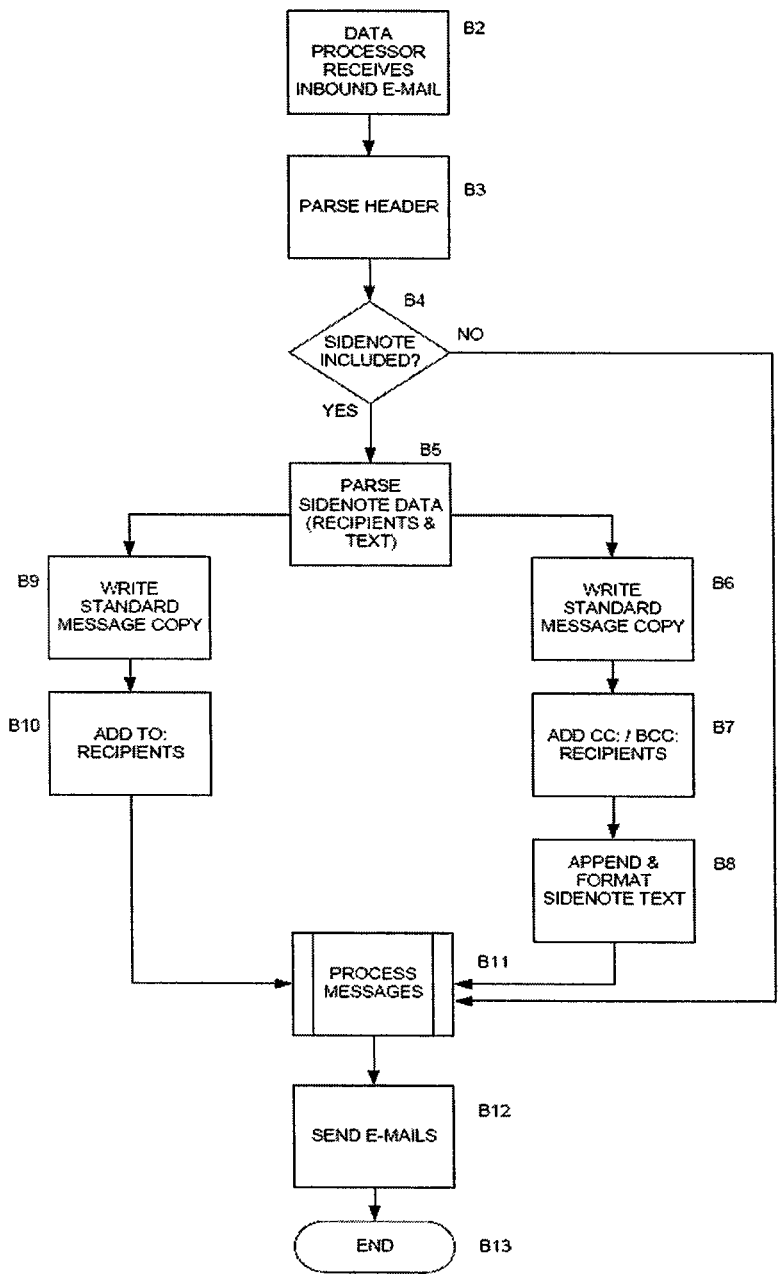
FIG. 4 illustrates a diagram of the processing system.
Figure 5:
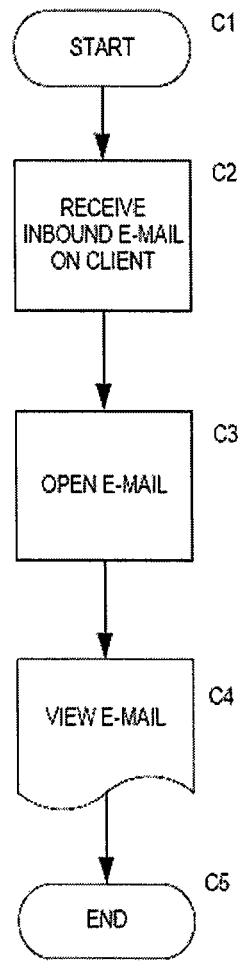
FIG. 5 illustrates a diagram of the receiving process.
Figure 5:
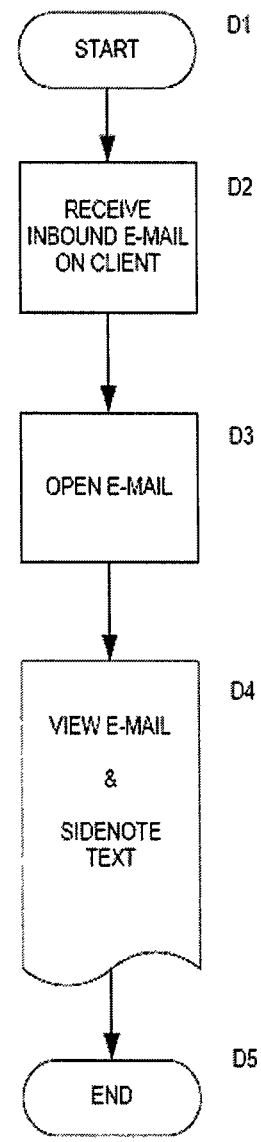

This process can be further detailed in three distinct stages, as detailed in FIGS. 3, 4, and 5.

FIG. 3 details the sending process of the distinct added message with an overview of what occurs at the sender's mail client. The process begins with the sender taking action to compose e-mail as normally done (A2). The sender adds the TO: addressees, as well as CC: and/or BCC: addressees if applicable (A3). The sender indicates (by clicking a button, checking a box, or other method) for the message to send (A4). The system scans to determine if there are CC and/or BCC addressees (A5). If there are no CC and/or BCC addressees, then the system begins to transmit the e-mail to all recipients (A11). If there are CC and/or BCC addressees (A6), then a text box displays with an entry pad to add the distinct added message (A7). The sender adds the distinct added message (A8), and indicates which recipients should receive the whole message plus the additional distinct message (A9). The sender then indicates complete and sends the message (A10).

FIG. 4 details the sending process of a distinct added message with an overview of what occurs at the sender's mail client, internal servers, or internet service processing servers. Firstly, the mail, complete with or without the distinct added message, is received by the data processor (B2). The processor parses the header of the e-mail (B3) to determine whether there is a distinct added message appended (B4). If there is no distinct added message, then the e-mail message is processed (B11) and the messages are transmitted (B12). If the header parsing identifies appended distinct added message (B4), then the appended distinct added message is parsed (B5) such that a copy of the whole message is made for each 'TO' recipient (B9), the TO recipients are added (B10), the e-mail message is then processed (B11) and the TO recipient messages are transmitted (B12) containing the whole e-mail. A further copy of the whole message is made for each CC and BCC recipient (B6), the CC and BCC recipients are added (B7), if indicated in the message parsing, the distinct added message data is appended to the whole message copies for the CC and/or BCC recipients as the message header instructs, and the message is reformatted (B8). These CC and BCC e-mail messages are then processed (B11) and the CC and BCC recipient messages are transmitted (B12) containing the whole e-mail plus the distinct added message data embedded.

FIG. 5 details the receiving process. For the TO recipients, they receive the inbound e-mail on their mail client (C2). If the recipient opens the email (C3) and views the e-mail (C4), they will see the whole message without any distinct added message. For the CC and/or BCC recipients, they receive the inbound e-mail on their mail client (D2). If the recipient opens the email (D3) and views the e-mail (D4), they will see the whole message with embedded distinct added message.

In FIGS. 6-9, the process is repeated with the main difference being that the processor processes the distinct added message and some authentication and/or encryption for data in transport to internet service processors.

Figure 6:
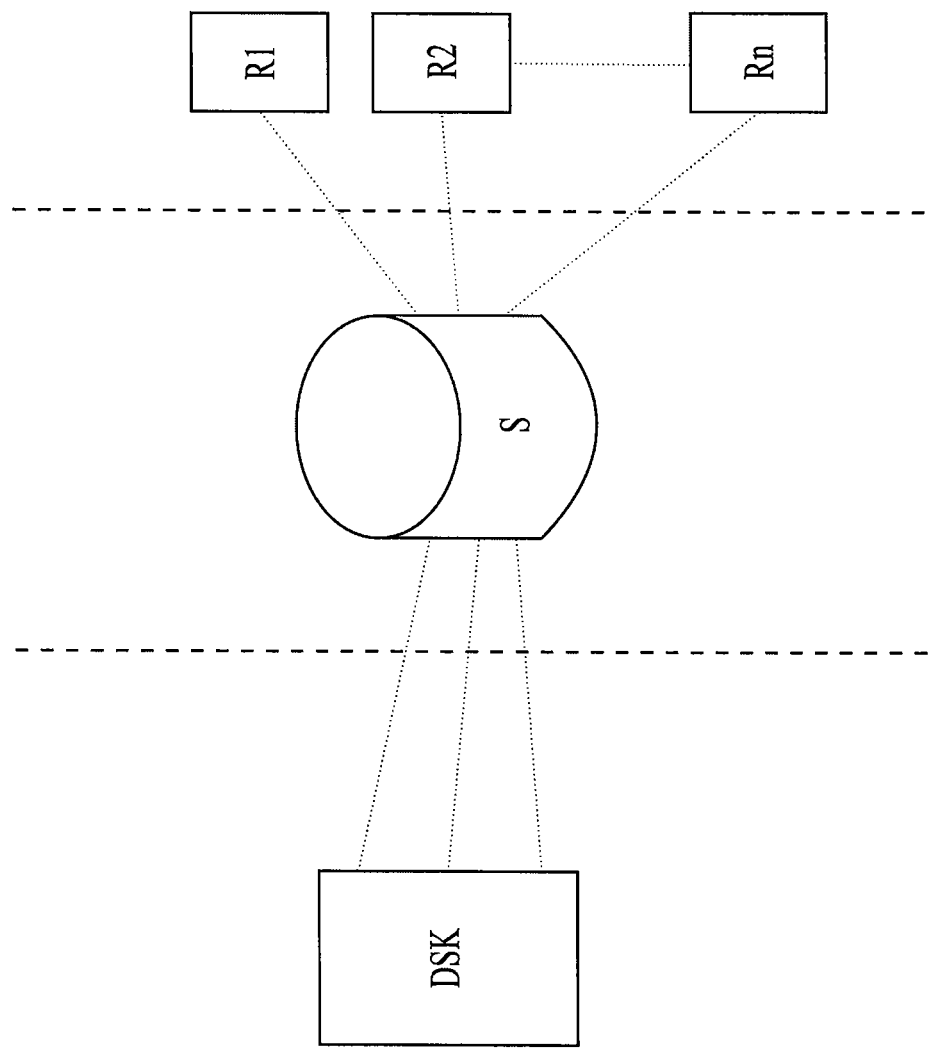
FIG. 6 illustrates an alternative embodiment of the system.

FIG. 6 illustrates a first alternative embodiment of the system in accordance with this invention. The first alternative embodiment is explained herein. A sender accesses a user-system (DSK) adapted to send email. Further, the user-system (DSK) includes partitioning means to partition email recipients into specific groups, typically the main recipient (R1) and the secondary recipients (R2 . . . . Rn). The user-system (DSK) prompts the user to create an email. Further, the user-system (DSK) prompts the user to populate the recipients' addresses; main recipient (R1) and secondary recipients (R2, . . . , Rn). The user-system in accordance with this invention now prompts the user to select whether it wants to add an added message to the existing main message. The added message is typically for the secondary recipients (R2, . . . , Rn). Upon populating the text field of the main mail and the recipient's address (R1, R2, . . . , Rn), the user-system (DSK) prompts the user to populate the text field of the added message, encrypts the added message and routes the main message and added message to a web based server (S). The server (S) breaks the mail into multiple mails depending on the number of recipients. The server (S) is further adapted to authenticate that the electronic mail is from an authorized user-system (DSK). If authenticated, the server (S) performs the task of decrypting the encrypted added message and appends the added message to the main message in accordance with preset choices of the sender. The added message may typically be appended at the top, at the bottom, attached to or placed in a number of places. The appended message may be in the form of text, picture, audio, video or a combination of these.

Figure 7:
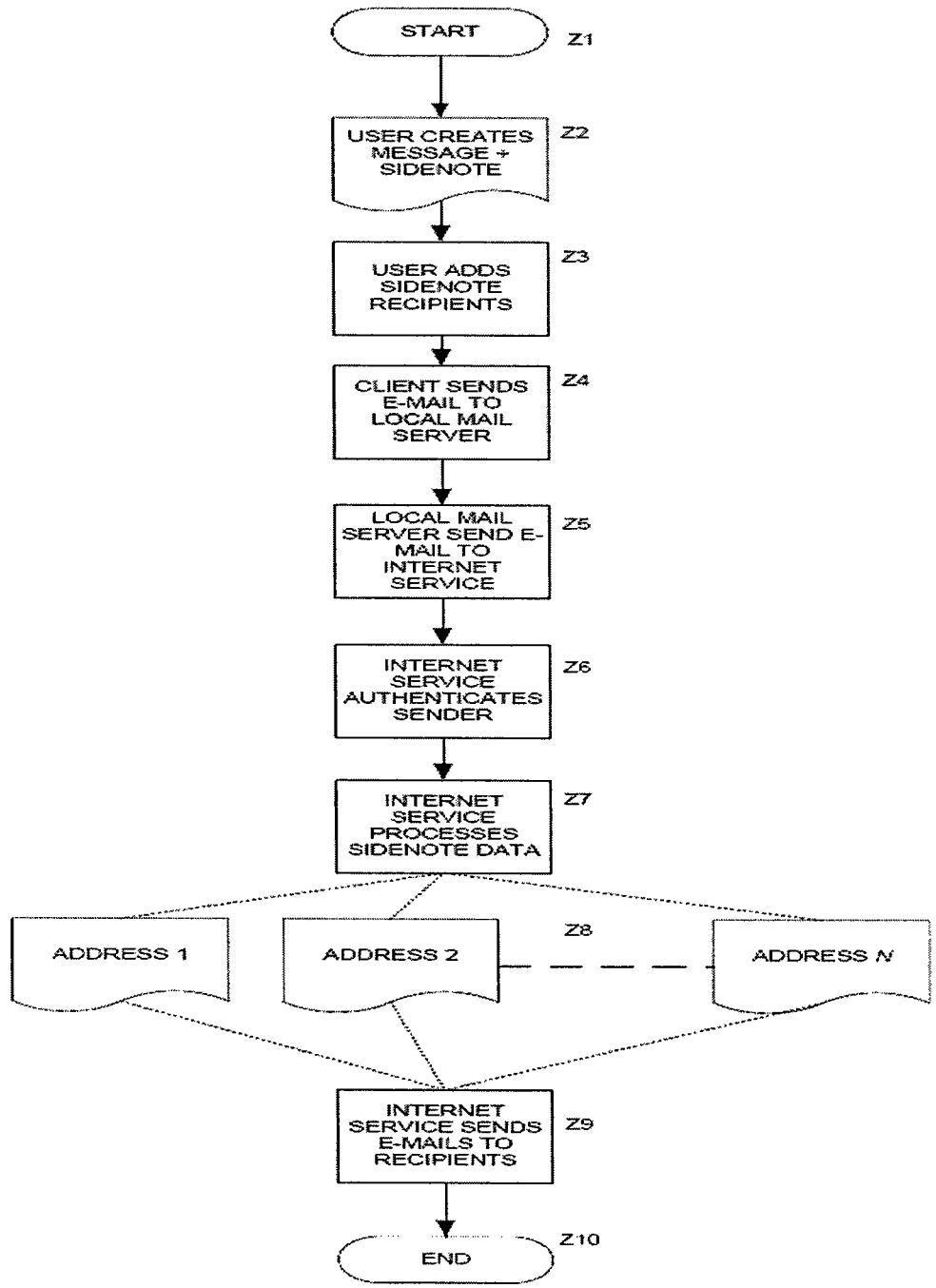
FIG. 7 illustrates a more detailed process of the alternative embodiment of FIG. 6.

FIG. 7 is a more detailed description of the system as described in FIG. 6. A sender composes a new message in an e-mail program (Z1). The sender adds the TO addressees, as well as CC and/or BCC addressees. After composing the message, before sending/transmitting, the sender indicates (by clicking a button, checking a box, or other method) that they would like to add a distinct message to some of the recipients of the main message (Z2). A text box opens and permits the sender to type in the distinct added message. The sender indicates (with a checkbox or button) whether they would like the distinct added message to be sent to certain recipients, for example, to only the CC recipients, only the BCC recipients, or both (Z3). The sender clicks the SEND/Transmit button (Z4). The distinct added message is encrypted and attached to the outbound e-mail with the instructions (CC or BCC) so that this data travels with the e-mail message as an attachment. Note that this could be done in any number of ways. The sender sends the email from their e-mail client which may route to a local server or may route directly to the internet service depending on the configuration (Z4). If the mail client sends to a local server, the local server then sends the mail to the internet service (Z5). In transport from the mail client or local server, there may be some authentication keys embedded and/or the distinct added message and/or email data may be encrypted in a manner that the internet service can authenticate to identify the message as from an authorized sender, and can decrypt the distinct added message data and message data if applicable (Z6). If from an authorized sender, the processing servers stop the e-mail, decrypt the attachment that contains the message instructions and the distinct added message. The e-mail is reformatted into a preferred format, for example, HTML, and the e-mail is transmitted to each TO recipient without the distinct added message. Based on the instructions that were attached to the e-mail, for example, for the CC and/or the BCC recipients, the message is reformatted into HTML and the distinct added message is placed in the top of the e-mail in a text table. Note, this could be appended at the bottom, attached, or placed in a number of places (Z8). The processor processes the distinct added message which includes separating the recipients and associating the appropriate distinct added message for each recipient as the sender had indicated (Z8). The CC and/or BCC e-mail is transmitted to each CC and/or BCC recipient with the new format and containing the distinct added message within the e-mail (Z9). Each CC and/or BCC recipient who opens their e-mail now sees an e-mail message with the appended distinct added message, where the TO recipients receive the e-mail as normally transmitted (Z10).

Figure 8:
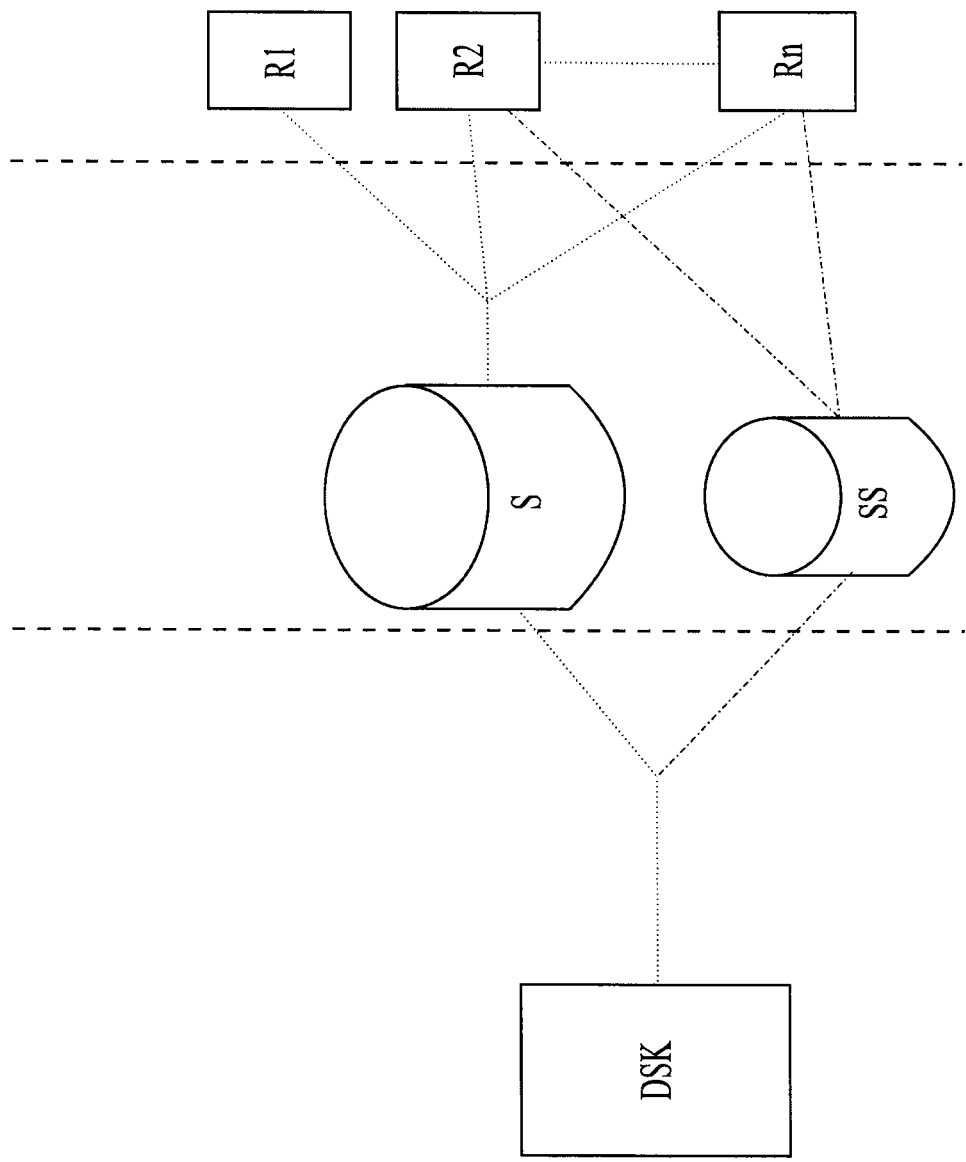
FIG. 8 illustrates another alternative embodiment of the system.

FIG. 8 illustrates a second alternative embodiment of the system in accordance with this invention. The second embodiment is explained herein. A sender accesses a user-system (DSK) adapted to send email. The user-system (DSK) prompts the user to create a main mail. Further, the user-system (DSK) includes partitioning means to partition email recipients into specific groups, typically the main recipient (R1) and the secondary recipient (R2, . . . , Rn). Further, the user-system (DSK) prompts the user to populate the recipients' addresses; main recipient (R1) and secondary recipients (R2, . . . , Rn). The user-system (DSK) in accordance with this invention now prompts the user to select whether it wants to add an added message to the existing main mail. The main mail is routed to the main recipient (R1) via the server (S). The added message is typically for the secondary recipients (R2, . . . , Rn). Upon populating the text field of the main mail and the secondary recipient's address (R2, . . . , Rn), the user-system (DSK) prompts the user to populate the text field of the added message which could be in the form of text, picture, audio, video or a combination of these. The user-system (DSK) then encrypts the added message and routes it to a standalone server (SS). This standalone server (SS) is adapted to host the added message. It may include pointer means adapted to point to the location of the added message along with the main message to be delivered to the intended recipients (R2, . . . , Rn). The standalone server (SS) may also include a timed display control means for displaying the added message to the intended recipients (R2, . . . , Rn) for a pre-determined period of time. The standalone server (SS) may further be adapted to authenticate that the email is from an authorized user-system (DSK).

Figure 9:
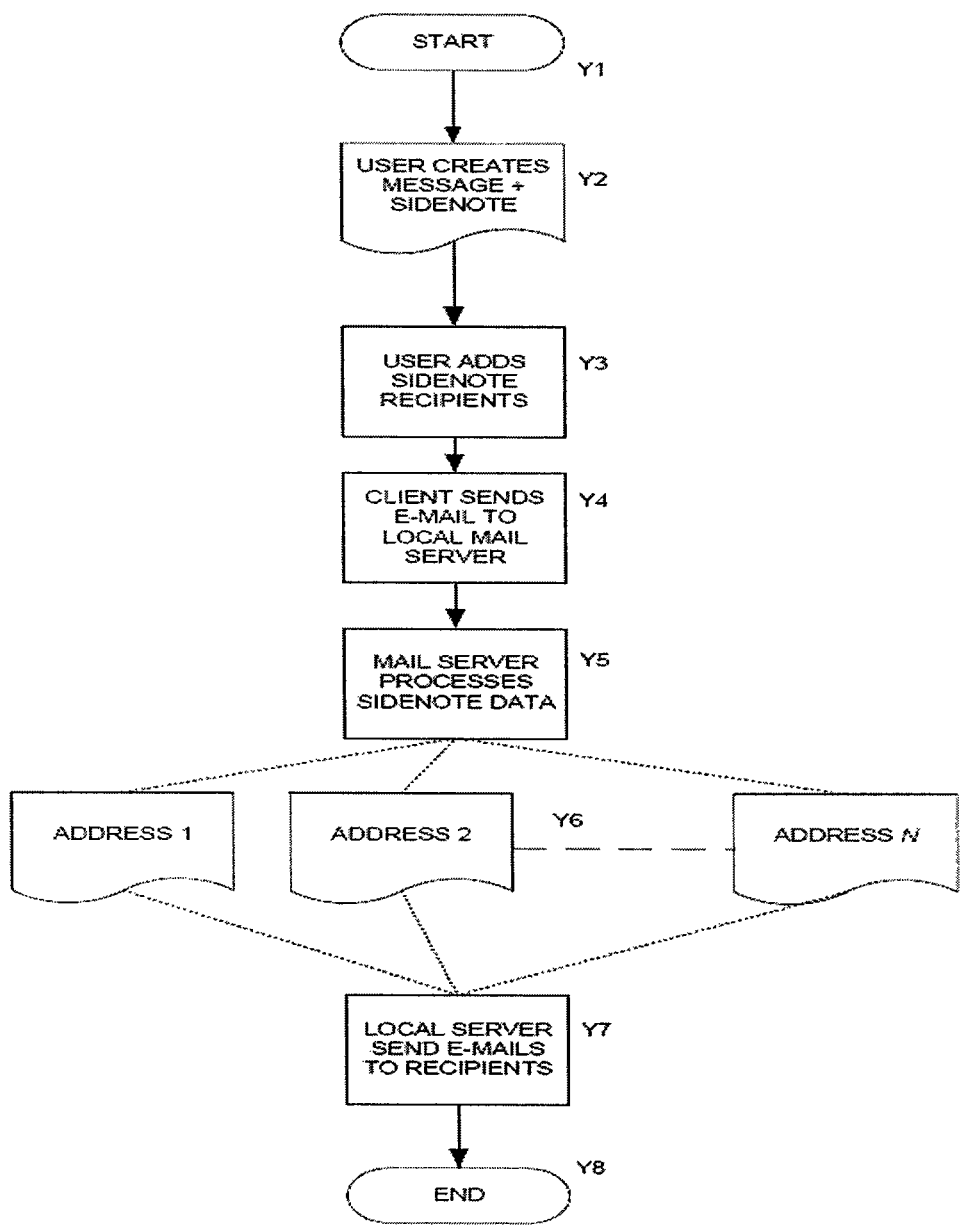
FIG. 9 illustrates a more detailed process of the alternative embodiment of FIG. 8.

FIG. 9 is a more detailed description of the system as described in FIG. 8. The sender composes a new message in an e-mail program (Y1) by creating a new message as normally done. Upon prompting, the sender adds a distinct message to the whole message (Y2). The sender indicates which recipients should receive the whole message and which recipients should receive the whole message in addition to the appended distinct added message (Y3). The sender sends the email from their e-mail client which routes to their local server (Y4). The processor at the local server processes the distinct added message (Y5) which includes separating the recipients and associating the appropriate distinct added message for each recipient as the sender had indicated (Y6). The local mail server (Y7) transmits to each recipient (Y8).

Figure 10:
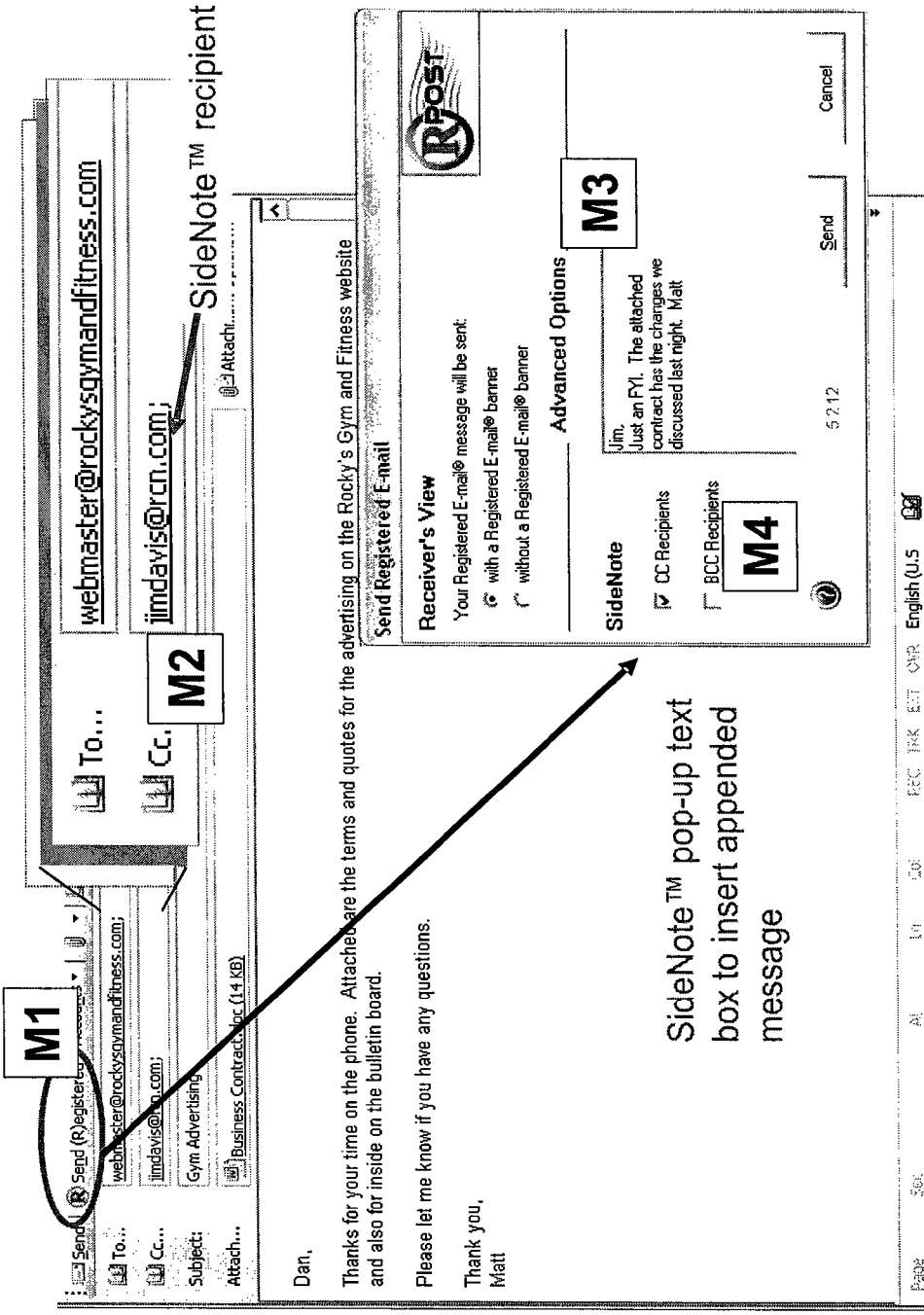
FIG. 10 illustrates a detailed computer screen view of the system at the sender's end.
Figure 11:
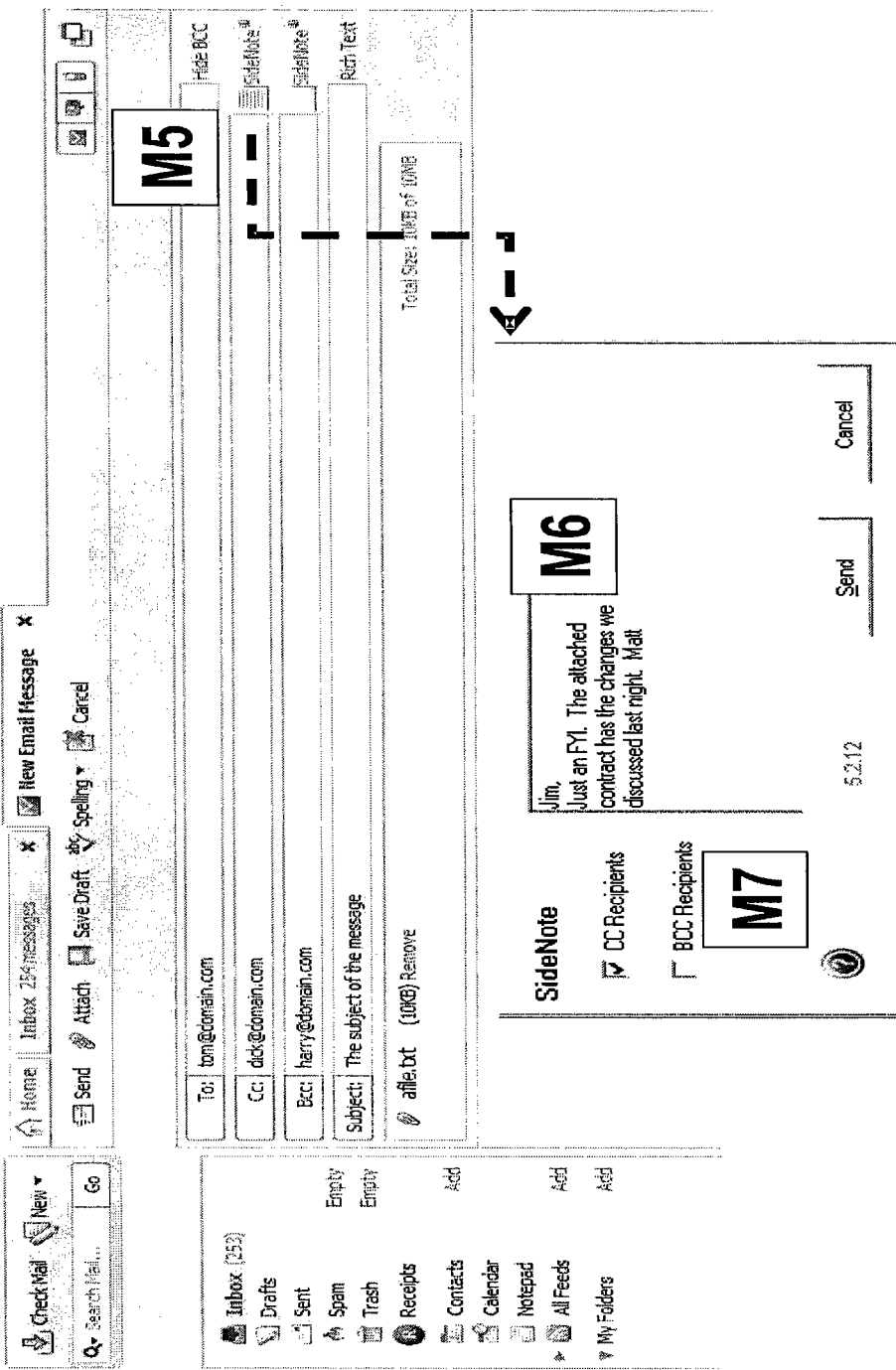
FIG. 11 illustrates an alternative detailed computer screen view of the system at the sender's end.
Figure 12:
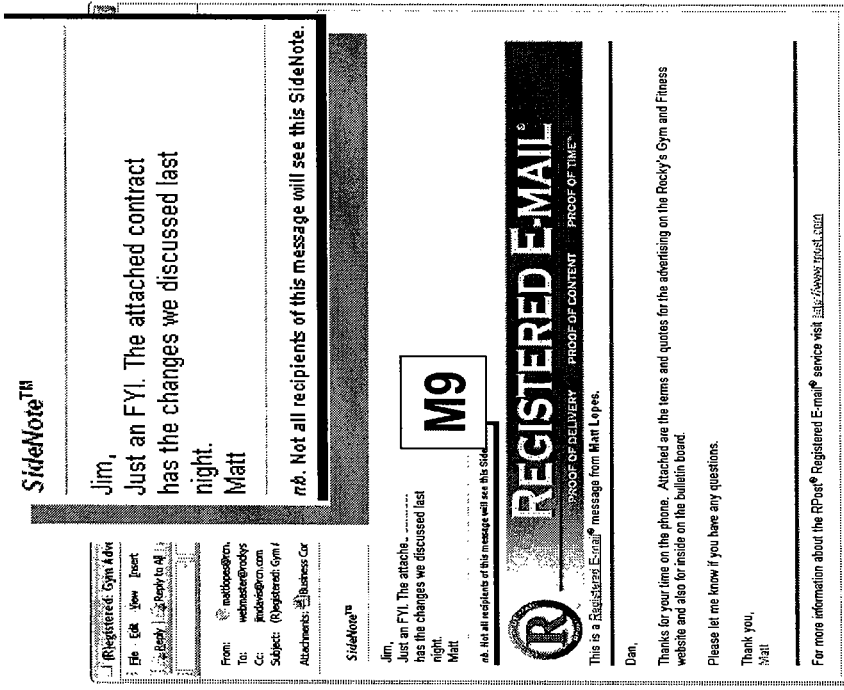
FIG. 12 illustrates a detailed computer screen view of the system at the receiver's end.
Figure 12:
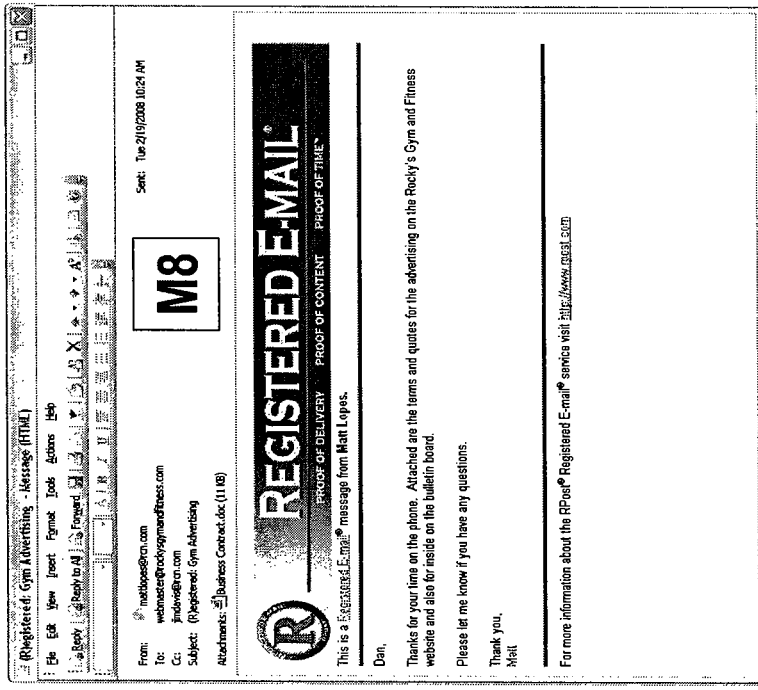

FIGS. 10-12 depict exemplary computer screen shots illustrating use of various embodiments of the system in accordance with the principles of the invention from the sender and receivers' perspective.

FIG. 10 shows a special SEND button (M1) that the sender selects if he would like the option of sending their message with the distinct added message to select recipients. In this case, the select recipients would be those in the CC field (M2). If there is an addressee in the CC field in this case, and the system is set up to optionally send a distinct added message to the CC recipients, then the special SEND button would trigger the pop-up text entry field (M3) if there was an address in the CC field. Alternatively, this process could occur with an addressee in the BCC field. Further, this process could occur when clicking the standard SEND button to provide the option of sending the distinct added message to any message recipient. In this example, the sender selects which class of recipients should receive the distinct added message (M4).

FIG. 11 depicts an alternative approach, which would be to add a distinct added message-enabling button independent of the SEND button (M5) which could be in line with the CC and/or BCC input fields. This would open a text box for distinct added message entry (M6) and an indication field indicating which class of recipients or which recipients should receive the distinct added message embedded in the message (M7).

For the recipient view, in FIG. 12, this example shows the recipient(s) in the TO field receive the whole message in a standard manner (M8) and the CC (and/or BCC) recipients, as instructed by the sender, receive the distinct added message embedded within the whole original email (M9).

While considerable emphasis has been placed herein on the particular features of the various embodiments described herein, it will be appreciated that various modifications can be made without departing from the principles of the invention. These and other modifications in the nature of the invention will be apparent to those skilled in the art from the disclosure herein, whereby it is to be distinctly understood that the foregoing descriptive matter is to be interpreted merely as illustrative of the invention and not as a limitation.

We claim:

1. An emailing system including a processor, a memory, and a network interface for creating and sending at least one email message and at least one distinct added message appended to the at least one email message via a network from a sender to a plurality of recipients' email addresses, said emailing system comprising:
   means for creating an email message;
   means for creating a distinct added message;
   an inputting means for creating a request for inputting at least one recipient's address for receiving said email message and also
   for inputting at least one recipient's address for receiving said email message along with said distinct added message;
   a first server to route said email selectively to requested addresses of said recipients;
   a second server for storing said distinct added message; and
   means for appending to append pointers to the email to be sent to those recipient's address who are to receive said email message along with said distinct added message to point to the location of the distinct added message, wherein the distinct added message is accessible by those recipients who are to receive said email message along with said distinct added message.

2. The emailing system of claim 1, further comprising partitioning means to partition email recipients into specific groups.

3. The emailing system of claim 1, further comprising an authenticating means for authenticating an identity of said sender.

4. The emailing system of claim 3, wherein the authenticating means are resident on said server.

5. The emailing system of claim 1, further comprising an encryption means adapted to encrypt said distinct added message and a decryption means adapted to decrypt said encrypted distinct added message.

6. The emailing system of claim 1, further comprising an encryption means adapted to encrypt said distinct added message and a decryption means adapted to decrypt said encrypted distinct added message, said encryption means being resident at the sender's end and said decryption means being resident on said server.

7. The emailing system of claim 3, wherein said authenticating means is partly resident at the sender's end and partly resident on said server.

8. The emailing system of claim 1 wherein, the means for said distinct added message includes means for creating said distinct added message, said message being selected from a group of messages consisting of text, picture, video, audio and a combination of text picture video and audio.

9. The emailing system of claim 1, wherein the second server includes a timed display control means for displaying said distinct added message to said address of requested recipient for a pre-determined time.

10. A method for creating and sending at least one email message and at least one distinct added message appended to the at least one distinct added message via a network from a sender to a plurality of recipients' addresses, said method comprising:
   prompting a sender to create an email message;
   requesting the sender to add an address for a first recipient for receiving said email message;
   requesting the sender to add an address for at least one-second recipient for receiving said email and a distinct added message;
   prompting the sender to compile said distinct added message;
   transferring said email to a server;
   transferring said distinct added message to a standalone server different from the server;
   routing said email via said server to an address of said first recipient; and
   routing said distinct added message via said standalone server to an address of said at least one second recipient.

11. The method of claim 10 wherein, routing of message via said standalone server includes routing said distinct added message and including a tag including an instruction to erase said distinct added message from a recipient's display after a pre-determined lapse of time.

12. The method of claim 10 wherein, said method includes authenticating an identity of the sender.

13. The method of claim 10 wherein said method includes appending pointers to the email by the servers, the pointers pointing to a location on the standalone server where the distinct added message is located, the pointers only being appended to the email to be routed to the at least one-second recipient who is to receive both email and the distinct added message; and wherein only the email including the pointers is routed to the at least one second recipient, the distinct added message remaining on the standalone server.

* * * * *

UNITED STATES PATENT AND TRADEMARK OFFICE
CERTIFICATE OF CORRECTION

PATENT NO.         : 8,478,981 B2                                                Page 1 of 1
APPLICATION NO.    : 12/395333
DATED              : July 2, 2013
INVENTOR(S)        : Zafar Khan et al.

It is certified that error appears in the above-identified patent and that said Letters Patent is hereby corrected as shown below:

In the Specification

Column 2, line 28, after "may" insert --be--.
      line 41, after "sent" insert --to--.

Column 3, line 9, between "ticating" and "identity" insert --the--.
      line 15, between "authenticating" and "identity" insert --the--.
      line 25, between "point" and "location" insert --to the--.
      line 45, between "to" and "address" insert --the--.
      line 48, between "to" and "address" insert --the--.
      line 54, before "address" insert --the--.
      line 56, before "message" insert --a--.

Column 5, line 56, between "with" and "embedded" insert --the--.
      line 60, between "to" and "internet" insert --the--.

In the Claims

Column 9, line 5, before "said distinct" insert --creating--.

Column 10, line 8, between "of" and "message" insert --said distinct added--.

Signed and Sealed this
Twenty-second Day of April, 2014

Michelle K. Lee
*Deputy Director of the United States Patent and Trademark Office*